United States Patent [19]

True

[11] Patent Number: 4,642,740

[45] Date of Patent: Feb. 10, 1987

[54] CONSTANT MAGNIFICATION LIGHT COLLECTION SYSTEM

[75] Inventor: Thomas T. True, Camillus, N.Y.

[73] Assignee: General Electric Company, Portsmouth, Va.

[21] Appl. No.: 663,656

[22] Filed: Oct. 22, 1984

[51] Int. Cl.[4] ............................ F21V 7/00; H04N 5/74
[52] U.S. Cl. ................................... 362/268; 362/296; 362/308; 362/347; 358/233
[58] Field of Search ............... 362/308, 268, 296, 297, 362/326, 327, 347, 304, 305, 331; 358/231, 233, 237, 238, 239

[56] References Cited

U.S. PATENT DOCUMENTS

| | | | |
|---|---|---|---|
| 2,273,801 | 2/1942 | Landis | 178/7.5 |
| 2,298,808 | 8/1942 | Ramberg | 178/7.5 |
| 2,309,788 | 2/1943 | Ramberg | 88/24 |
| 2,453,003 | 11/1948 | Edwards | 178/7.5 |
| 2,455,476 | 12/1948 | Epstein | 178/7.5 |
| 2,459,637 | 1/1949 | Frihart et al. | 250/164 |
| 2,508,764 | 5/1950 | Miller | 88/24 |
| 2,531,509 | 11/1950 | Grundmann | 88/57 |
| 2,590,240 | 3/1952 | Epstein | 178/5.4 |
| 2,682,197 | 6/1954 | Davis |  |
| 2,697,182 | 12/1954 | Sheldon | 313/65 |
| 2,741,940 | 4/1956 | Drodofsky |  |
| 2,749,801 | 6/1956 | Clotar |  |
| 3,107,296 | 8/1963 | Hine | 250/42 |
| 3,290,436 | 12/1966 | Good et al. | 178/5.4 |
| 3,325,592 | 6/1967 | Good et al. | 178/5.4 |
| 3,345,462 | 10/1967 | Good et al. | 358/233 |
| 3,538,249 | 11/1970 | Graser, Jr. et al. | 358/233 |
| 4,305,099 | 12/1981 | True et al. | 362/296 |
| 4,389,701 | 6/1983 | Phillips | 362/308 |

FOREIGN PATENT DOCUMENTS 970322 9/1964 United Kingdom .

Primary Examiner—William A. Cuchlinski, Jr.
Assistant Examiner—D. M. Cox

[57] ABSTRACT

A high efficiency light collection system for a projector such as a light valve projector provides constant tangential magnification for all zones so that the images of the source just fills the pupil of the projection system thereby giving the best source utilization in all zones. The light collection system comprises a reflector (60) behind the source and a correcting refractor (61) in front of the source. The preferred embodiment uses an aconic reflector having continuously changing zonal focus with a single asphere corrector lens that has exactly compensating zonal focus characteristics. It is also possible to use a conic reflector, but this requires two asphere corrector lenses in order to provide the constant tangential magnification characteristics.

10 Claims, 10 Drawing Figures

CONSTANT MAGNIFICATION COLLECTION SYSTEM
COLLECTION FROM 38 TO 138 DEGREES
LIGHT VALVE INPUT ACCEPTANCE CONE IS 3 TO 10.75 DEGREES
SYSTEM F/# IS 2.68
DISTANCE FROM ARC TO RASTER IS 13.00 INCHES
DISTANCE FROM ARC TO CORRECTOR LENS IS 5.30 INCHES
ENVELOPE CLEARANCE AT ARC IS 1.0410 INCHES DIAMETER
ARC MAGNIFICATION IS 12.9032
MIRROR DIAMETER AT REAR IS 1.0697 INCHES
MIRROR DIAMETER AT FRONT IS 5.4969 INCHES
TOTAL COLLECTED LIGHT IS 76.5578%

FOR A LENS POLYNOMIAL :
$Z = A*Y^2 + B*Y^4 + C*Y^6 + D*Y^8 + E*Y^{10} + E*Y^{12} + F*Y^{14}$ INCHES
FOR ASPHERE LENS INDEX OF REFRACTION = 1.4919

| ACONIC MIRROR | ASPHERE LENS |
|---|---|
| A= 3.32507E-01 | A= 1.42817E-01 |
| B= 3.68400E-04 | B= -2.71100E-04 |
| C= 5.73280E-03 | C= -4.89000E-02 |
| D= -2.24110E-03 | D= 4.13240E-02 |
| E= 5.62230E-04 | E= -2.24800E-02 |
| F= -7.08100E-05 | F= 5.52950E-03 |
| G= 3.78410E-06 | G= -5.02640E-04 |

MIRROR VERTEX IS LOCATED -7.79941E-01 INCHES FROM THE ARC
LENS VERTEX IS LOCATED 5.08671E+00 INCHES FROM THE ARC

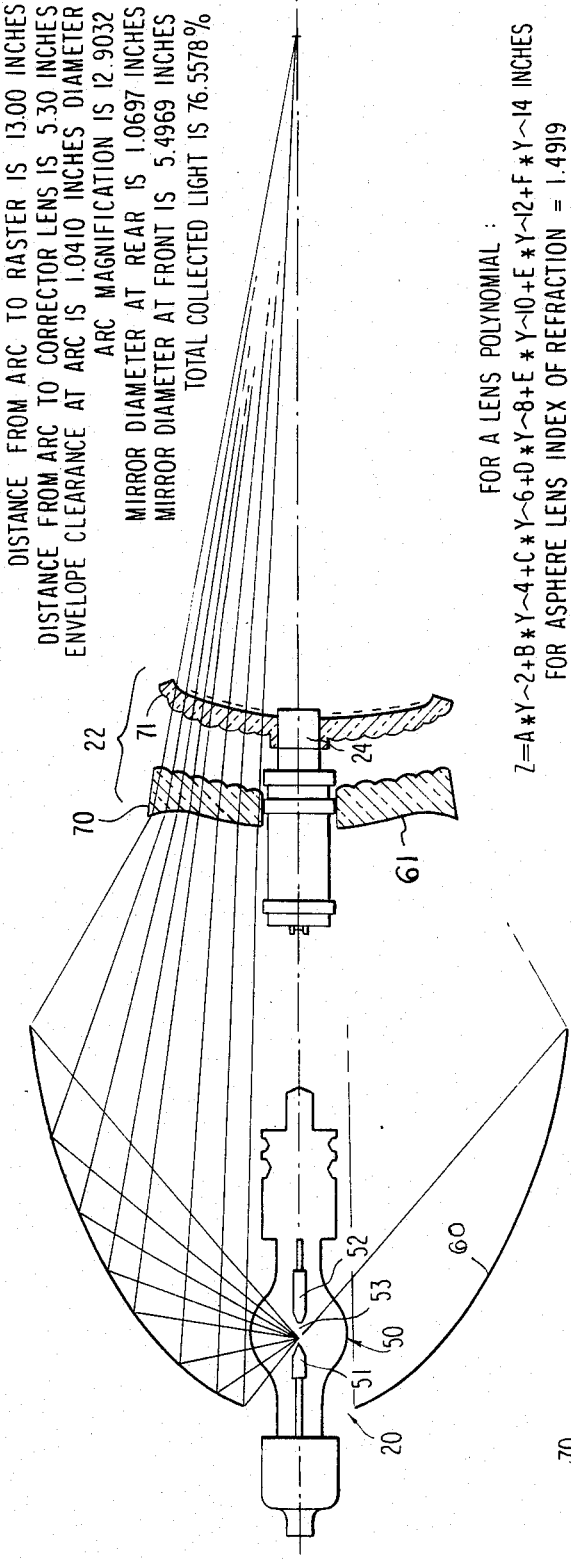

CONSTANT MAGNIFICATION COLLECTION SYSTEM
COLLECTION FROM 40.0000 TO 130.0000 DEGREES
DISTANCE FROM ARC TO RASTER IS 14.0000 INCHES
FOCAL LENGTH OF ELLIPSOID IS 12.0000 INCHES
DISTANCE FROM REFLECTOR TO FIRST CORRECTOR LENS IS .2500 INCHES
ENVELOPE CLEARANCE AT LATUS RECTUM IS 1.0479 INCHES DIAMETER
ARC MAGNIFICATION IS 13.4328
TOTAL COLLECTED LIGHT IS 70.4416 %

CONSTANT MAGNIFICATION LIGHT COLLECTION SYSTEM

BACKGROUND OF THE INVENTION

This invention generally relates to improvements in light collection systems providing light beams for projectors and, more particularly, to a constant magnification light collection system of improved efficiency for use in light valve projectors.

Typical prior art color projection systems of the light valve type, as shown in U.S. Pat. No. 3,290,436 to W. E. Good et al. and U.S. Pat. No. 3,325,592 to W. E. Good et al., include a light collection system having an arc lamp located at the adjacent focus of a simple ellipsoidal reflector. A light beam is reflected from the ellipsoidal reflector through a pair of spaced lens plates having corresponding pluralities of rectangular lenticules stacked into horizontal rows and vertical columns. The second lens plate carries the input light mask of a schlieren optical system. With this arrangement, efficient utilization is made of light from the arc lamp, and uniform distribution of light is produced on the light modulating medium.

The basic light collection system disclosed in the Good et al. patents has been improved by the use of a compound reflector as disclosed in U.S. Pat. No. 4,305,099 to Thomas T. True et al. In the True et al. light collection system, the compound reflector is formed of full, uninterrupted surfaces of revolution in combination with spaced lens plates, each having a plurality of lenticules, to provide increased light collection efficiency while maintaining uniform light flux density. In the preferred embodiment of that invention, an ellipsoidal reflector is positioned behind the arc, and a spherical reflector is positioned forward of the arc and outside the outer acceptance limit of the beam. Other combinations are disclosed including positioning the forward spherical reflector within the inner acceptance limit of the beam and positioning the ellipsoidal reflector forward of the arc with the spherical reflector behind the arc.

The compound reflector system as described in the True et al. patent provides high light efficiency, but it has the disadvantages that it is expensive to produce and requires very precise alignment of the multiple-mirror components. What is needed is a light collection system for light valve projectors which exhibits similar high light efficiencies but is less complex to produce and align and potentially less expensive.

SUMMARY OF THE INVENTION

It is therefore an object of the present invention to provide an improved light collection system which is economical to produce.

It is a further and more specific object of the invention to provide a light collection system for a light valve projector which uses a simpler single-mirror collection system yet achieves efficiency equivalent to that of a compound mirror collection system.

The objects of the invention are attained by the use of a single aconic mirror and a single asphere refractive lens. The preferred embodiment of the invention combines a concentrated light source with a collection mirror having a continuously changing zonal focus and a refractive lens that has exactly compensating zonal focus characteristics. The reflector has a long focal distance at the rear, with positive lens power required to bring the ray to a focus at the desired center-of-raster point on the axis. As the angle leaving the source is increased from the rear limit angle to the forward limit angle, the reflector focus distance shortens and the lens correction changes from positive through neutral to a negative power at the periphery. The light collection system according to the invention is not only less expensive to produce than the compound reflector light collection system, but prototype tests have shown it to be even more efficient. As a result of the overall light efficiency of the present invention, even more economies can be achieved in the projection system for a given light output.

BRIEF DESCRIPTION OF THE DRAWINGS

The foregoing and other objects, advantages and aspects of the invention will be better understood from the following detailed description of the invention with reference to the drawings, in which:

FIG. 3 is a cross-sectional view of a preferred embodiment of the light collection system according to the invention;

FIG. 3A is an enlarged partial view of the lenticular optics of FIG. 3;

DETAILED DESCRIPTION OF THE INVENTION

Figure 1:
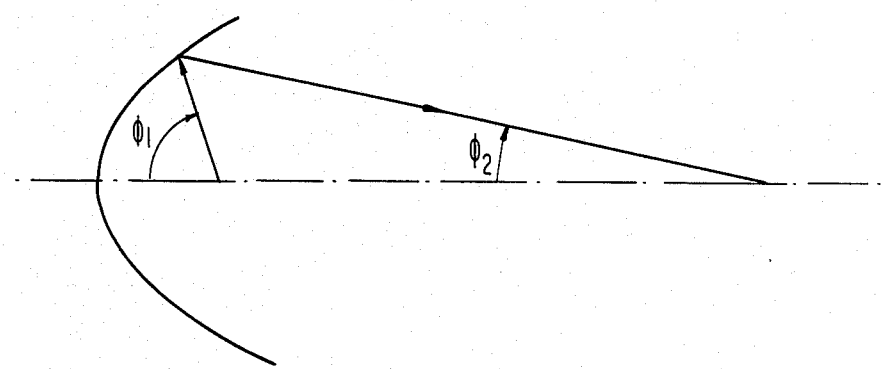
FIG. 1 is a graphical representation of the zonal magnification in a conventional collection system using a conic collection mirror.

Some prior art light valve arrangements have the electron gun on the optical axis with light entering the valve surrounding the gun. Because of the finite f/number of the system optics and light obscuration by the electron gun, light is only accepted within discrete inner and outer cone angles about the axis. Typical light valves accept ±9.6° outer cone, corresponding to f/3 optics, and ±3° inner cone. In general, a light collection system to be used with a light valve should be designed for the following attributes:

(1) The proportion of the source light which can be utilized by the light valve should be maximized. The light valve can only transmit light which is contained within the discrete inner and outer cone angles of the optical system.

(2) The variation of flux density from inner to outer zones of the input pupil should be minimized.

(3) The variation of source magnification from inner to outer zones should be minimized.

(4) The cost and complexity of the light collection system should be minimized.

Light collection systems have traditionally been designed utilizing single-conic ellipsoidal or parabolic shaped reflectors. However, these systems are limited in the amount of light which can be collected and focused into the inner and outer acceptance cones of the light valve. Analysis shows that the maximum possible light is collected when the forward and rear extreme angles about the latus rectum are symmetrical. For an inner zone angle, $\phi_o$, and an outer zone angle, $\phi_m$, the collected light will be in a zone about the source, from a rear angle, $90°-\psi$, to a front angle, $90°+\psi$. The collected light will be $\sin\psi$ for a source which radiates uniformly in all directions where $$\psi = \sin^{-1}\left(\frac{[\cos\phi_o][\sin(\phi_m - \phi_o) - (\sin\phi_m - \sin\phi_o)]}{\sin(\phi_m - \phi_o) - [\cos\phi_o][\sin\phi_m - \sin\phi_o]}\right)$$

For a light valve with $\pm 3°$ inner cone and $\pm 9.6°$ outer cone, light can be collected in a $\pm 31.6°$ zone about the latus rectum of the conic. This means that only about 52% of the total light can be collected and about half of that is transmitted through the light valve input slots.

The relatively low collection efficiency of the single conic reflector is considerably improved by the use of a two-reflector compound arrangement as described in the above-referenced patent to True et al. The collected light zones are increased beyond that of the single ellipse by collecting half the light by direct reflection off the ellipse and collecting the other half by a sphere which refocuses its reflected light through the arc tube and onto the ellipse. Although there are some losses introduced by the multiple reflections and paths through the arc tube envelope, the system still gives about 50% better efficiency than that of the single conic reflector. While the compound reflector approach gives the best efficiency of any collection system known in the prior art, it does have some disadvantages for application to a lower cost light valve system. First, the compound system is inherently more expensive than a single-reflector system. Two large, precise reflectors must be oriented in perfect alignment to realize the efficiency advantages. This leads to the necessity of using electroform mirrors instead of less expensive components. Second, since half of the collected light must go through two mirror reflections and three envelope walls, the efficiency becomes sensitive to mirror reflectivity and envelope absorption. This causes the light output to decrease more rapidly with arc tube and reflector aging than would occur with a single reflector. Also, heating of the arc tube by absorption becomes more severe with age.

The present invention realizes the simplicity and lower cost of a single-reflector light collection system while at the same time achieving a light collection efficiency comparable to that of the compound system. In order to better understand how this has been accomplished, it is necessary to first understand the concept of constant magnification.

Zonal magnification in a conventional collection system utilizing a conic collection mirror is determined by the relationship of the angle of collection and the angle of incidence at the plane as illustrated in FIG. 1. With reference to that figure, the conic relationships are:

$$\cos\phi_1 = \frac{\cos\phi_2 - \frac{2\epsilon}{1+\epsilon^2}}{1 - \left(\frac{2\epsilon}{1+\epsilon^2}\right)\cos\phi_2}$$

and the magnification is:

$$\frac{\sin\phi_1}{\sin\phi_2} = \frac{d\phi_1}{d\phi_2} = \frac{1 - \epsilon^2}{1 + \epsilon^2 - 2\epsilon\cos\phi_2}$$

where $\epsilon$ is the eccentricity of the ellipsoid. For a simple conic collection system, magnification of the source will vary significantly for the different zones collected. Generally, the image formed by rear collection zones will have highest magnification and that from the forward-going zones will have lowest magnification. This variation of magnification is a concern in conventional film projection systems as well as for the special needs of a light valve projection system.

In a light valve projection system, the high magnification in the inner zones around the electron gun causes concentration of flux density and arc image overfilling of the schlieren slots resulting in poor light transmission through the slots. Also, the low magnification in outer zones means these slots are underfilled by the arc image, resulting in lower collection efficiency from the source. Ideally, it is desired to have a collection system which has a constant magnification for all zones. In this manner, the images of the source can just fill the slots, giving best source utilization in all zones. The desirability of this ideal condition has been recognized for some time, but realization of such a system has not heretofore been achieved.

Figure 2:
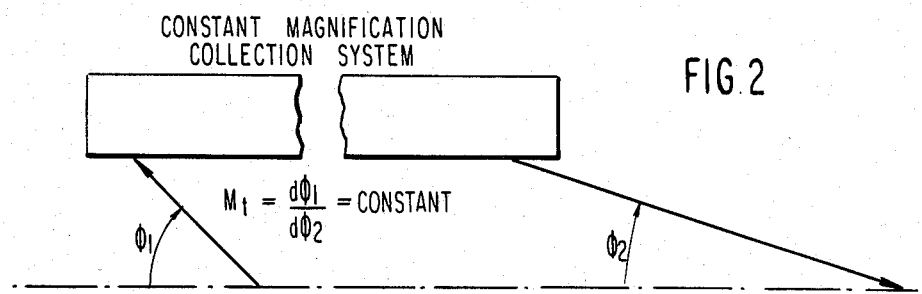
FIG. 2 is a graphical representation of the parameters of a constant magnification light collection system.

For constant tangential magnification, $M_t$, to be achieved, the derivative of the angle leaving the source with respect to the zonal angle entering the light valve must be constant as illustrated in FIG. 2. This means that equal increments of the angle leaving the source must result in a fixed proportional increment of angle entering the light valve pupil. It is obvious then, that the relationship of the angle $\phi_1$ and the angle $\phi_2$ cannot be the same as for the conic collector.

The collection system according to the present invention perfectly satisfies the relationships for constant tangential magnification. In a preferred embodiment of the invention, a collection system was designed for a f/2.68 light valve system and a 100° collection swath as shown in FIG. 3. The lamp assembly 20 according to a preferred embodiment of the invention is shown incorporated in an electron gun-on-axis light valve projection system. This system is only partially shown in FIG. 3, the details being shown in the above-referenced patent to True et al. However, the system typically includes a set of lens plates 22 mounted around an electron gun 24. The gun 24 emits an electron beam which impinges against a light modulating medium forming a part of the light valve as is well known in the art. As shown in FIG. 3A, the lens plate set 22 includes a first lens plate member 70 of generally circular outline which consists of a plurality of lenticules 80 of rectangular configuration stacked in horizontal and vertical array. The lens plate set also includes a second lens plate member 71, spaced from the first lens plate member 70, of generally circular outline also having a plurality of lenticules 78 of rectangular configuration on one face thereof stacked in horizontal and vertical array. An input mask 72 of the light valve system is located on the opposite face of lens plate 71 and includes both vertically oriented slots (not shown) and horizontally extending slots 75. As described in the art, this quadrature arrangement of input slots allows selective control of the spectral components of light energy which are passed through them.

The lamp assembly 20 shown in FIG. 3 supplies light for the light valve projection system and includes an arc lamp 50 having within its sealed envelope an anode 51 and a cathode 52 forming a gap 53 within which a high light intensity arc will form. The lamp is coaxial with the light valve projection system and passes through the aconic reflector 60 along its axis of revolution. The reflector 60 functions as a light collection mirror having a continuously changing zonal focus and is compensated by a refractive lens 61 that has exactly compensating zonal focus characteristics. In the preferred embodiment of the invention illustrated in FIG. 3, the first lens plate member 70 and the compensating refractive lens 61 are formed as a unitary structure. That is, the lenticules 80 are formed on one surface while on the opposite surface, the compensating surface of lens 61 is formed. It will of course be understood that the first lens plate member 70 and the compensating refractive lens 61 may be physically separate optical members. The reflector 60 has a long focal distance at the rear, with positive lens power required to bring the ray to a focus at the desired center-of-raster point on the axis. As the angle leaving the source is increased from the rear limit angle to the forward limit angle, the reflector focus distance shortens and the lens 61 correction changes from positive through neutral to a negative power at the periphery.

Figure 4:
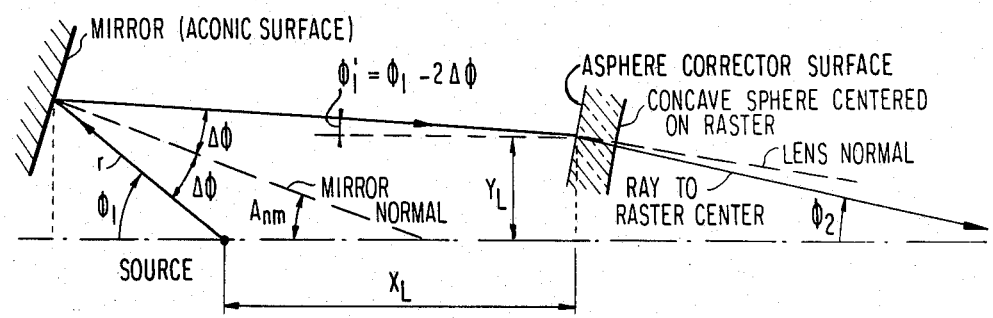
FIG. 4 is a partial cross-sectional view illustrating the parameters of the aconic mirror surface and the asphere corrector lens of the invention.

With reference to FIG. 4, the basic relationships which must be satisfied simultaneously are as follows:
Mirror:

$$1. \frac{1}{r} \frac{dr}{d\phi_1} = \tan(\Delta\phi),$$

where $\phi_1$ and $r$ are polar coordinates of mirror intercept with a ray leaving the source at $\phi_1$ angle.

$$Anm = \text{Mirror normal angle} = \frac{\phi_1 + \phi_1'}{2} = \phi_1 - \Delta\phi$$

Lens Intercept:

$$Y_L = r\sin\phi_1 - (X_L + r\cos\phi_1)\tan\phi_1' \quad (2)$$

$Dx_L/dY_L = \tan An_L$ where $An_L$ is the lens normal to surface.

$\sin(An_L - \phi_1') = N_g \sin(An_L - \phi_2)$, where Snell's law is applied to relate bending at asphere lens surface. An alternative to Snell's Law is to use Fermat's principle, making optical path length equal for all rays to achieve focus.

$$\frac{d\phi_1}{d\phi_2} = \text{tangential magnification} = \text{constant} = M_t$$

$$\phi_1 = M_t\phi_2$$

The relationships shown in the equations above are a statement of mirror reflection relationship to its surface contour, lens ray bending relationship to its surface contour, and geometry of ray intercepts between the two surfaces. The total surface contours must satisfy these relationships simultaneously in order to act as a focal system which satisfies the constant magnification criterion.

The separate relationships form a set of simultaneous differential equations. This set of simultaneous equations appears to have no simple closed-form solution, so a solution was achieved by iterative computer techniques. Although the real surfaces will be generated as continuous surfaces defined by polynomials, the computer approach was to visualize their profile as a polygon made up of many straight-line segments. Each polygon segment of the mirror has a corresponding polygon segment on the lens, and the two segments are forced to satisfy the equations given above. The satisfaction of the defining equations is assured by making them part of a core algorithm in the program which is iterated enough times to obtain arbitrarily close correspondence. Continuity of the two surfaces is assured by starting at one end of the mirror and lens surfaces and iterating along the surfaces, then relating each tiny straight-line segment to the adjacent segments to form a continuous polygon.

Figure 5:
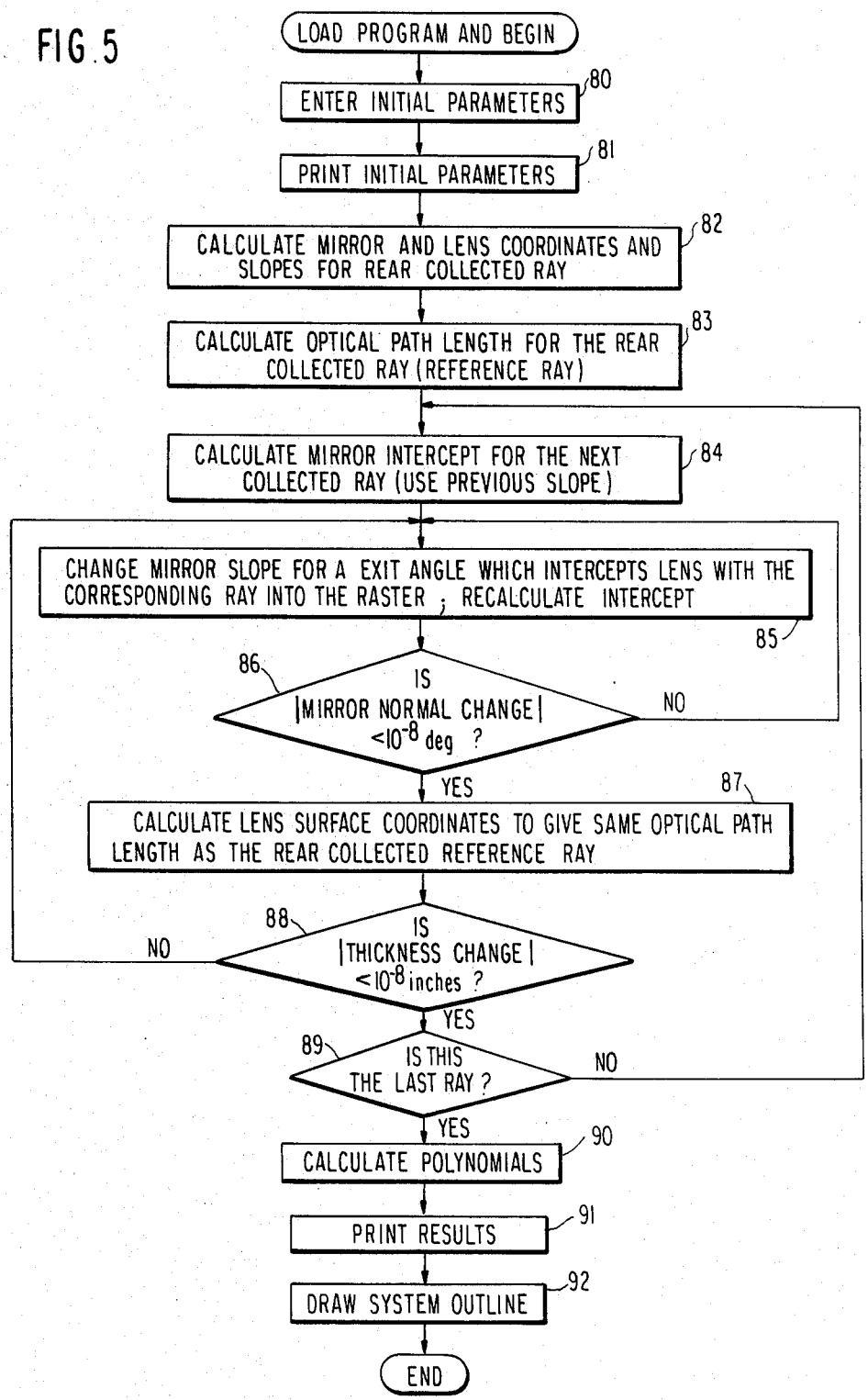
FIG. 5 is a flow diagram of the iterative computer program used to generate the reflector and refractor surfaces of the light collection system shown in FIG. 3.

The procedure using the iterative computer program is illustrated in FIG. 5. The program begins by entering the initial system parameters as depicted by block 80. The initial system parameters are as follows:

(a) Inner and outer cone angles accepted by the light valve.

(b) Forward and rear angles to be collected by the mirror.

(c) Number of angular increments leaving the source for which the coordinates of the mirror and lens will be determined.

(d) Relationship desired between rays leaving the source and corresponding rays entering the light valve. Usually, the relationship will be the constant $d\phi_1/d\phi_2$ condition for constant tangential magnification. However, any other relationship desired could be entered. This defines a fan of, say 1,000 rays leaving the source and a corresponding fan of 1,000 rays entering the light valve.

(e) Initial angle of the first ray leaving the rear of the mirror (ray #0).

(f) Position of the source relative to the light valve.

(g) Inner position of the lens surface at which ray #0 intercepts the lens asphere surface.

After the initial system parameters have been entered, they may be printed as depicted in block 81 to provide a check on the entry of these parameters. Then, the initial polar coordinates of the mirror and the slope necessary to reflect the rear ray (ray #0) to the desired lens intercept are determined as depicted by block 82. Then, in block 83, the initial lens surface slope needed to bend the ray for focus at the raster center is determined. In block 84, the program moves to the first angular increment at the mirror (ray #1) and determines the ray intercept with the mirror, assuming that the slope remains the same as that for the preceding ray. The program determines the intercept of the corresponding ray from the center of the raster to the lens surface, assuming that the lens surface slope remains constant. Then in block 85, the program determines a new angle for the mirror which will reflect the current ray to the desired lens intercept. The decision block 86 causes the program to iterate until a slope and mirror intercept are found which give proper reflection angle and surface continuity simultaneously. Then, as depicted in block 87, the program determines a new bend angle at the lens intercept and revises tne lens slope iteratively until a slope consistent witn surface continuity is found. The decision block 88 causes the program to loop back to block 85 until the parameters do not change significantly. Then the program goes to the next angular increment looping back to block 84 as depicted by decision block 89. This loop is continued until all angular increments between the rear ray and the forward ray are iterated. These steps will generate surface coordinates for the mirror and lens which are consistent with surface continuity and which satisfy mirror reflection and lens refraction relationships. When this process has completed, the program then determines the polynomials which fit the mirror and lens surfaces by least-squares fitting techniques as depicted by block 90. This determines a polynomial power series for each surface which approximates the exact points of the curves. The results are then printed in block 91 and the system outline drawn in block 92.

Figure 6:
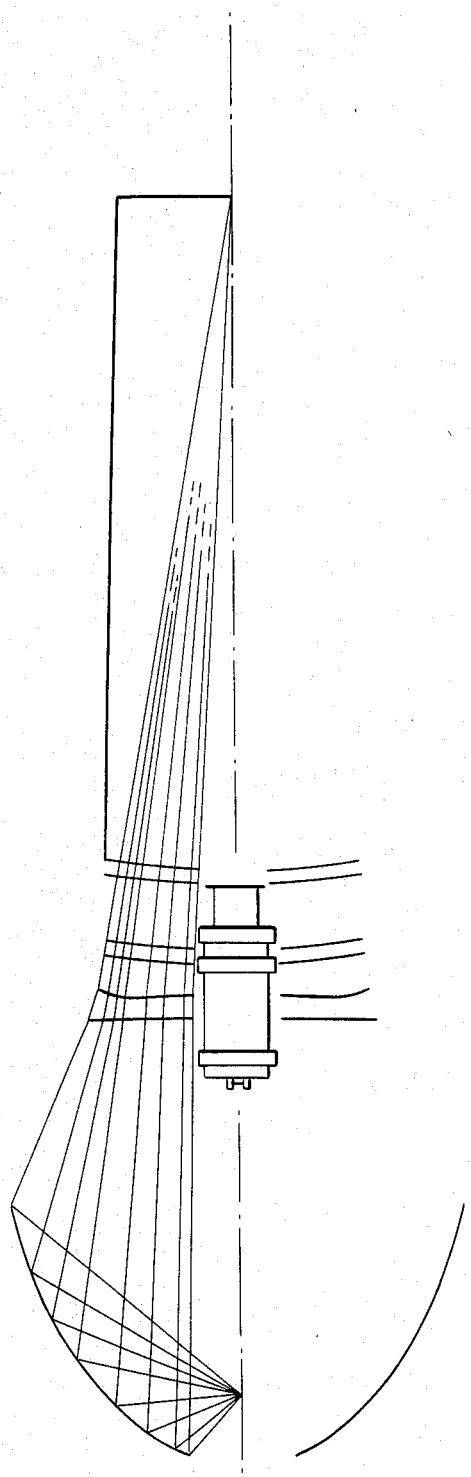
FIGS. 6 and 7 are cross-sectional views of alternative embodiments of the light collection system according to the invention which were developed using a planoasphere for the corrector lens.
Figure 7:
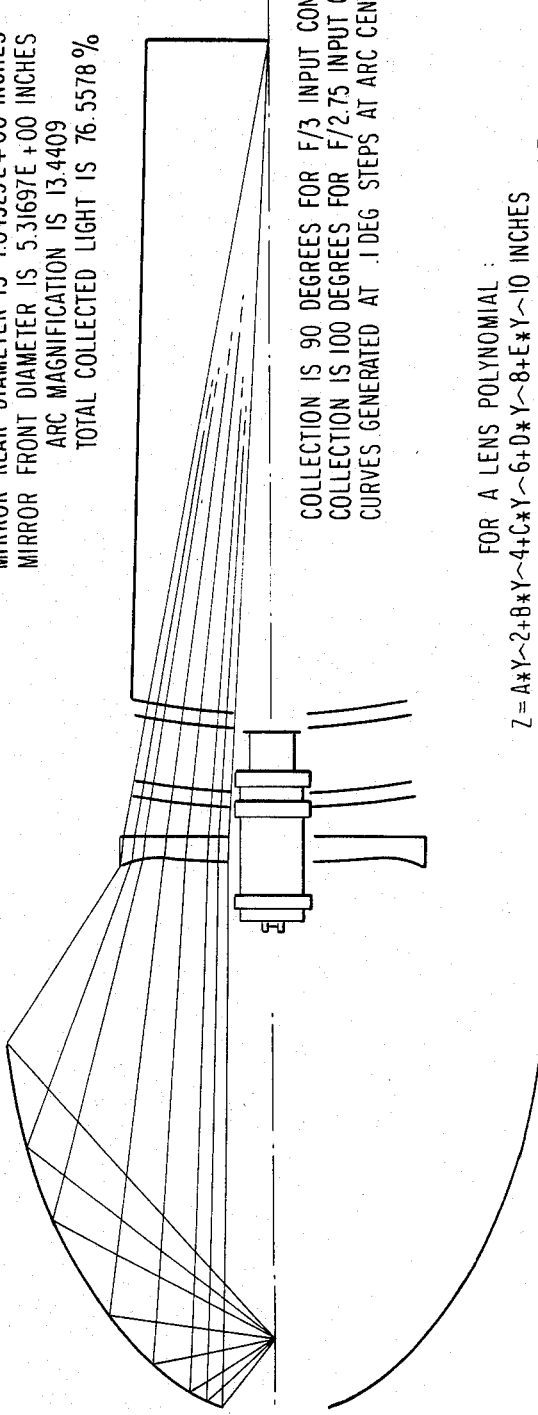

A similar computer program can be used to design a collection system for constant tangential magnification using a plano-asphere for the corrector lens. Executions for a specific design are shown in FIGS. 6 and 7. In each case, two degrees of freedom are needed to satisfy both the focal properties and the constant-magnification relationships simultaneously with real, continuous surfaces. The freedom to bend one reflector surface and one lens surface as desired allows the system to be designed. For the examples shown in FIGS. 3, 6 and 7, one aconic mirror bounce and one asphere lens bend are used to accomplish the desired results.

Figure 8:
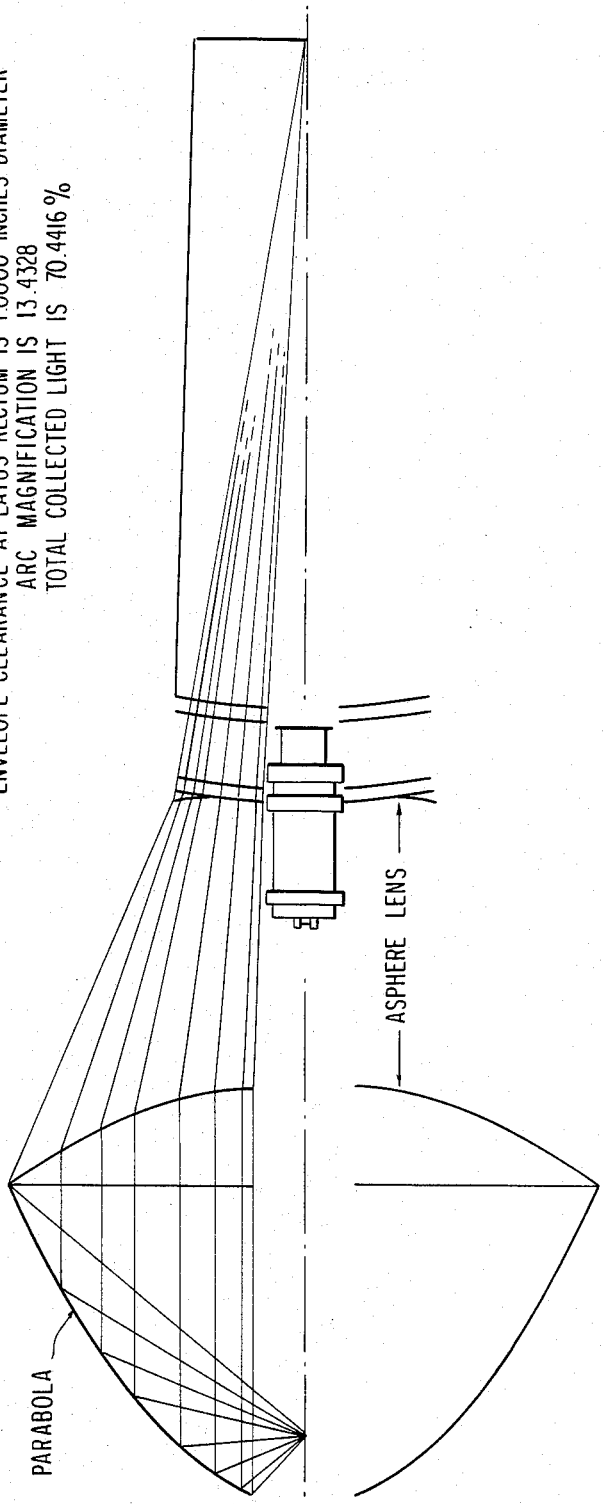
FIG. 8 is a cross-sectional view of another alternative embodiment of the invention using a paraboloid as the reflector.
Figure 9:
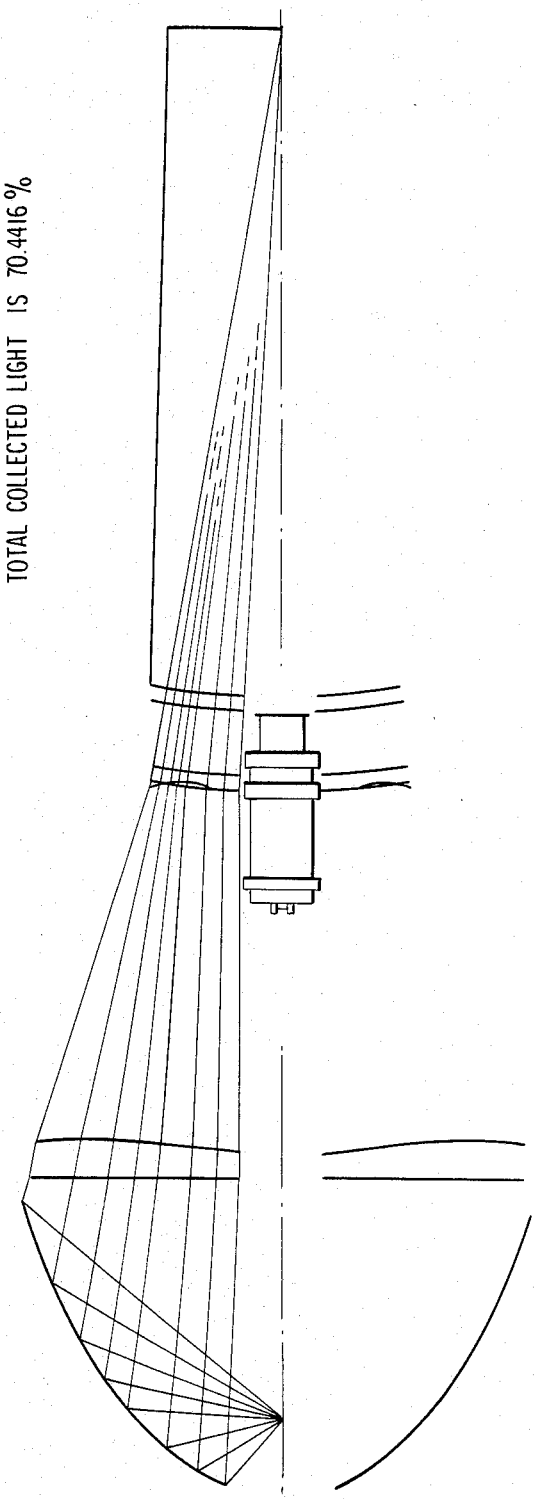
FIG. 9 is a cross-sectional view of yet another alternative embodiment of the invention using an ellipsoid as the reflector.

Another embodiment which also allows a real solution to a constant magnification system is to use a conic reflector and to use two different asphere lens surfaces to gain the two degrees of freedom needed. In FIG. 8, a paraboloid is used as the reflector, and in FIG. 9, an ellipsoid is used as the reflector. Although these embodiments are not as simple as the preferred embodiment shown in FIG. 3, they may allow the use of existing conic reflectors in light valve projectors. In these embodiments, the conic reflector combined with the first asphere lens result in a net progression of focal-length versus input angle similar to that needed for the one aconic mirror used in the preferred embodiment.

Test results for a prototype of the preferred embodiment shown in FIG. 3 compared with the single conic reflector light collection system of the prior art and the compound reflector system disclosed in the above-referenced patent to True et al. are summarized in the following table.

|  | Compound System With Dichroic Reflector Coatings & BBAR Lens Ref = .95 assumed | Glass Ellipsoid With Dichroic Reflector Coating (no cover plate) Ref = .95 | Constant Magnification With Bare Nickel, unpolished reflector & uncoated acrylic corrector lens. Ref = .65 × .92 |
|---|---|---|---|
| Total into int. sphere without input window or aperture | 15.805 Lum/Watt 100% | 13.606 86.09% | $\frac{10.77}{.65 \times .92} = 18.01$ 113.6% |
| Total through .30" by 0.825" vertical slot at raster plane (equivalent to all-magenta slots at input window) | 9.675 Lum/Watt 100% | 8.18 84.55% | $\frac{6.78}{.65 \times .92} = 11.34$ 117.2% |
| Total through G-14 input window without dichroics (nominal dichroic transmission approx. 40%) T6F lens used | 4.128 100% | 3.395 82.24% | $\frac{2.842}{.65 \times .92} = 4.753$ 115.1% |

As can be seen from the above table, the constant magnification collection system according to the present invention, when normalized for equivalent reflectivity, gives even better relative performance than the compound system.

Although the invention has been described with particular reference to embodiments useful as light valve projection systems, it is to be understood that light collection systems according to the invention are also useful in different types of projection systems. For example, motion picture projectors and film strip projectors could profitably employ the light collection systems of the invention.

While the invention has been described with reference to specific embodiments, it will be appreciated that many additional modifications may be made by those skilled in the art, and it is intended that the appended claims cover all such modifications and changes as may fall within the true spirit and scope of the invention.

I claim:

1. In a light projection system for projecting light from a source, the improvement in a light collection system which satisfies the relationships for constant tangential magnification for all zones so that the image of the source just fills the pupil of the projection system thereby giving the best source utilization in all zones, said light collection system comprising:
   a reflector positioned behind the source; and
   a correcting refractor positioned in front of the source;
   the reflector having a reflection relationship to its surface contour and the refractor having a ray bending relationship to its surface contour such that together, they achieve the overall relationship $D\phi_1/d\phi_2 = $ constant where $\phi_1$ is the collection angle and $\phi_2$ is the final angle leaving the refractor.

2. The light collection system as recited in claim 1 wherein said reflector is an aconic mirror with a long focal distance at the rear and as the angle leaving the source is increased from the rear limit angle to the forward limit angle, the reflector focus distance shortens, and said refractor is a single asphere corrector lens having a positive lens power at the center and changes from positive through neutral to a negative lens power at the periphery.

3. The light collection system as recited in claim 2 wherein the corrector lens is an asphere lens.

4. The light collection system as recited in claim 3 wherein the geometry of ray intercepts are defined by the following relationships:

$$\frac{1}{r}\frac{dr}{d\phi_1} = \tan(\Delta\phi), \text{ where } \phi_1 \text{ and } r \text{ are the polar}$$

coordinates of mirror intercept with ray leaving the source at $\phi_1$ angle, the lens intercept $Y_L$ and $X_L$ dimensions measured from the source are $Y_L = r\sin\phi_1 - (X_L + r\cos\phi_1)\tan\phi_1'$, where
$\phi_1' = \phi_1 - 2\Delta\phi$ and $dX_L/dY_L = \tan An_L$ where $An_L$ is the lens normal to surface, $\sin(An_L - \phi_1) = Ng\sin(An_L = \phi_2)$ $d\phi_1/d\phi_2 = $ tangential magnification $=$ constant $= M_t$ $\phi_1 = M_t\phi_2$.

5. The light collection system as recited in claim 2 wherein the corrector lens is an asphere/plano lens.

6. The light collection system as recited in claim 2 wherein the corrector lens is an asphere/concave lens.

7. The light collection system as recited in claim 1 wherein said reflector is a conic mirror and said refractor comprises two asphere corrector lenses.

8. The light collection system as recited in claim 1 wherein the light projection system is a light valve and said light source is an arc lamp.

9. The light collection system as recited in claim 8 wherein the projection system is of the type including an electron gun which emits an electron beam which impinges against a light modulating medium.

10. The light collection system as recited in claim 9 wherein said electron gun and said arc lamp are coaxial with the axis of revolution of said reflector, said system further comprising a lenticular lens assembly coaxial with said axis of revolution and located forward of said reflector, said lenticular lens assembly including slots for controlling light projected by said light collection system.

* * * * *